(12) United States Patent
Abet et al.

(10) Patent No.: US 6,820,415 B2
(45) Date of Patent: Nov. 23, 2004

(54) METHOD FOR OPERATING AN INTERNAL COMBUSTION ENGINE USING EXHAUST GAS PURIFICATION SYSTEM, AND INTERNAL COMBUSTION ENGINE

(75) Inventors: Oliver Abet, Althuette (DE); Holger Adler, Stuttgart (DE); Brigitte Konrad, Blaustein (DE); Thomas Liebscher, Fellbach (DE); Michel Weibel, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/336,993

(22) Filed: Jan. 6, 2003

(65) Prior Publication Data

US 2003/0136115 A1 Jul. 24, 2003

(30) Foreign Application Priority Data

Jan. 11, 2002 (DE) ........................................ 102 01 016

(51) Int. Cl.$^7$ ................................................ F01N 3/00
(52) U.S. Cl. .............................. 60/286; 60/274; 60/285; 60/295; 123/299
(58) Field of Search .......................... 60/274, 284, 285, 60/286, 295, 297, 303; 123/295, 299, 300, 443; 423/234, 237, 239.1

(56) References Cited

U.S. PATENT DOCUMENTS

| | | | | |
|---|---|---|---|---|
| 4,836,161 A | * | 6/1989 | Abthoff et al. | 123/299 |
| 5,839,275 A | * | 11/1998 | Hirota et al. | 60/285 |
| 5,960,627 A | * | 10/1999 | Krampe et al. | 60/286 |
| 5,974,793 A | * | 11/1999 | Kinugasa et al. | 60/285 |
| 6,082,325 A | * | 7/2000 | Digeser et al. | 60/285 |
| 6,109,024 A | * | 8/2000 | Kinugasa et al. | 60/286 |
| 6,176,079 B1 | * | 1/2001 | Konrad et al. | 60/297 |
| 6,338,244 B1 | * | 1/2002 | Guenther et al. | 60/285 |
| 6,345,496 B1 | * | 2/2002 | Fuwa et al. | 60/285 |

FOREIGN PATENT DOCUMENTS

| | | |
|---|---|---|
| DE | 197 50 226 | 10/1998 |
| DE | 198 20 828 | 11/1999 |

\* cited by examiner

Primary Examiner—Tu M. Nguyen
(74) Attorney, Agent, or Firm—Kenyon & Kenyon

(57) ABSTRACT

In a method for operating an internal combustion engine using exhaust gas purification system, and internal combustion engine, the method for operating an internal combustion engine with exhaust gas purification system, in which a rich mode of the internal combustion engine with a rich exhaust gas composition and a lean mode of the internal combustion engine with a lean exhaust gas composition are set alternately, and by the exhaust gas purification system with a rich exhaust gas composition ammonia is synthesized and stored and with a lean exhaust gas composition nitrogen oxides are reduced to form nitrogen by means of the stored ammonia. The quantity of fuel which is introduced by a combustion cycle of the internal combustion engine is introduced by at least one preinjection, at least one main injection and at least one afterinjection, the at least one preinjection and the at least one main injection are burnt under excess oxygen in order to generate a quantity of nitrogen oxides which is sufficient for the ammonia synthesis, and a rich or lean exhaust gas composition is set by the at least one afterinjection. The method may be used, for example, for exhaust gas purification in motor vehicle diesel engines.

30 Claims, 1 Drawing Sheet

METHOD FOR OPERATING AN INTERNAL COMBUSTION ENGINE USING EXHAUST GAS PURIFICATION SYSTEM, AND INTERNAL COMBUSTION ENGINE

CROSS-REFERENCE TO RELATED APPLICATIONS

The present application claims priority to Application No. 102 01 016.1, filed in the Federal Republic of Germany on Jan. 11, 2002, which is expressly incorporated herein in its entirety by reference thereto.

FIELD OF THE INVENTION

The present invention relates to a method for operating an internal combustion engine with exhaust gas purification system, in which a rich mode of the internal combustion engine with a rich exhaust gas composition and a lean mode of the internal combustion engine with a lean exhaust gas composition are set alternately, and by the exhaust gas purification system with a rich exhaust gas composition ammonia is synthesized and stored and with a lean exhaust gas composition nitrogen oxides are reduced to form nitrogen by the stored ammonia.

The present invention also relates to an internal combustion engine with exhaust gas purification system for performing the method according to the invention.

BACKGROUND INFORMATION

Nitrogen oxides in oxygen-rich combustion exhaust gases can be reduced very successfully to form nitrogen with the aid of ammonia. In this context, it is appropriate for the ammonia to be generated in a catalytic converter unit in the vehicle itself. The ammonia-generating catalytic converter unit may be formed, for example, by a three-way catalytic converter which, with a substoichiometric exhaust gas composition, synthesizes ammonia $NH_3$ from nitrogen oxides $NO_x$ and hydrogen $H_2$. The ammonia is fed into a downstream nitrogen oxide reduction catalytic converter when the exhaust gas composition is substoichiometric or rich. When the exhaust gas composition is subsequently superstoichiometric, or lean, this ammonia reduces nitrogen oxides to form nitrogen in the nitrogen oxide reduction catalytic converter. The quantity of ammonia generated is dependent on the quantity of nitrogen oxides available during substoichiometric or rich combustion.

The term lean mode denotes a superstoichiometric engine mode, in which excess oxygen, i.e., $\lambda > 1$, prevails during the combustion. The term rich mode is understood as meaning a substoichiometric engine mode, in which excess fuel, i.e., $\lambda < 1$, prevails during the combustion. Accordingly, a lean exhaust gas composition indicates an excess of oxygen in the exhaust gas, and a rich exhaust gas composition indicates an excess of fuel in the exhaust gas.

German Published Patent Application No. 198 20 828 describes an exhaust gas purification system which with a rich exhaust gas composition uses a first catalytic converter unit to generate ammonia from nitrogen oxides and hydrogen present in the exhaust gas and stores the ammonia which is generated in a second catalytic converter unit. With a lean exhaust gas composition, nitrogen oxides which are present in the exhaust gas are subjected to a reduction reaction using the temporarily stored ammonia as reducing agent. To ensure that sufficient nitrogen oxides are present in the exhaust gas even with a rich exhaust gas composition, in order to synthesize a significant quantity of ammonia, a third catalytic converter unit, which with a lean exhaust gas composition temporarily stores nitrogen oxides which are present in the exhaust gas and with a rich exhaust gas composition releases the previously stored nitrogen oxides again, is connected upstream of the first catalytic converter unit, which is intended to generate ammonia with a rich exhaust gas composition.

German Published Patent Application No. 197 50 226 describes an engine control unit for a diesel engine with exhaust gas purification system, which is provided with an adsorption device for nitrogen oxides $NO_x$, which adsorbs nitrogen oxides with a lean exhaust gas composition. To regenerate the adsorber system, a rich exhaust gas composition, in which the exhaust gases have a reducing atmosphere, is required from time to time. To set a rich or lean exhaust gas composition, a quantity of fuel is injected by a preinjection, a main injection and an afterinjection of fuel. The afterinjection of fuel is substantially only evaporated and treated but is only burnt to a small extent, and consequently there is a greatly increased emission of unburned hydrocarbons HC and carbon monoxide CO. When the adsorption device releases the stored nitrogen oxides when there is a rich exhaust gas composition, the reaction products hydrocarbon HC and carbon monoxide CO on the adsorber surfaces are used to convert nitrogen oxides into nitrogen $N_2$.

It is an object of the present invention to provide a method for operating an internal combustion engine and also an internal combustion engine in which, by influencing the combustion of fuel in the internal combustion engine, a quantity of nitrogen oxides which is sufficient for the synthesis of significant quantities of ammonia is provided even with a rich exhaust gas composition.

SUMMARY

The above and other beneficial objects of the present invention are achieved by providing a method and an internal combustion engine as described herein.

The present invention provides a method for operating an internal combustion engine with exhaust gas purification system, in which a rich mode of the internal combustion engine with a rich exhaust gas composition and a lean mode of the internal combustion engine with a lean exhaust gas composition are set alternately, and by the exhaust gas purification system with a rich exhaust gas composition ammonia is synthesized and stored and with a lean exhaust gas composition nitrogen oxides are reduced to form nitrogen by the stored ammonia, in which method the quantity of fuel which is introduced during a combustion cycle of the internal combustion engine is introduced by at least one preinjection, at least one main injection and at least one afterinjection, the at least one preinjection and the at least one main injection are burnt under excess oxygen in order to generate a quantity of nitrogen oxides which is sufficient for the ammonia synthesis, and a rich or lean exhaust gas composition is set by the at least one afterinjection.

By these measures, it is possible to generate a sufficient quantity of nitrogen oxide even in the event of rich combustion throughout the entire combustion operation and a rich exhaust gas composition resulting therefrom, so that a significant quantity of ammonia may be synthesized during rich mode. Since significantly greater quantities of nitrogen oxides are available compared to conventional methods for producing a rich mode for the ammonia synthesis, the duration of the rich-mode phases may be shortened.

Furthermore, there may be no need for measures for temporarily storing nitrogen oxides during the lean mode and subsequently releasing them in rich mode.

It may be provided that the at least one afterinjection is at least partially burnt in the combustion chamber and contributes to the engine load.

The total quantity of fuel injected may contribute to the engine load. It is also possible to reach very high exhaust gas temperatures more quickly than with standard diesel engine combustion. Such high exhaust gas temperatures may be required in an ammonia-generating catalytic converter in order to synthesize ammonia from nitrogen and hydrogen.

The combustion of the quantity of fuel introduced during a cycle of the internal combustion engine may occur in rich mode without exhaust gas recirculation.

As a result, the preinjection quantities and the main injection quantity may be converted in the combustion chamber with a very high oxygen excess, with the result that a significantly higher formation of nitrogen oxide in the combustion chamber may occur compared to standard combustion with exhaust gas recirculation. Nevertheless, it is possible to set a rich combustion with a rich exhaust gas composition by the at least one afterinjection.

At least one first afterinjection, which burns in the combustion chamber, and at least one further, offset afterinjection may be provided in order to set a lean or rich exhaust gas composition.

A further, offset afterinjection may allow particularly flexible and at the same time accurate setting of the exhaust gas composition. An accurate setting of the engine load may be effected by the first afterinjection.

The starts of injection of the preinjections in rich mode may substantially correspond to the starts of injection in lean mode. The starts of injection of the main injections in rich mode may substantially correspond to the starts of injection in lean mode.

These measures may allow the transition between lean mode and rich mode to occur without being noticed by a driver of a motor vehicle having the internal combustion engine. Furthermore, this selection of the starts of injection may also promote generation of nitrogen oxides in rich mode.

The problem on which the present invention is based may also be solved by providing an internal combustion engine with exhaust gas purification system for performing the method according to the present invention, in which the exhaust gas purification system is provided with a first catalytic converter unit, which with a rich exhaust gas composition generates ammonia from corresponding exhaust gas constituents, and with a second catalytic converter unit, which is connected downstream of the first catalytic converter unit and with a rich exhaust gas composition temporarily stores ammonia which is generated by the first catalytic converter unit and with a lean exhaust gas composition subjects nitrogen oxides which are present in the exhaust gas to a reduction reaction using the temporarily stored ammonia as reducing agent, in which internal combustion engine an injection system having an arrangement configured to introduce a quantity of fuel by at least one preinjection, at least one main injection and at least one afterinjection, and an arrangement configured to set an excess of oxygen in rich mode during the combustion of the at least one preinjection and at least one main injection in the combustion chamber, and an arrangement configured to alter the time, quantity and duration of the at least one afterinjection in order to set a rich or lean exhaust gas composition.

These measures may make it possible, in the exhaust gas purification system, to dispense with a nitrogen oxide adsorber, which stores nitrogen oxides during a lean mode and releases them again during rich mode, or to reduce the size of a nitrogen oxide adsorber of this type. Since nitrogen oxide adsorbers of this type may also store oxygen, which in the phases with a rich mode may delay the release of the stored nitrogen oxides, dispensing with or reducing the size of a nitrogen oxide adsorber of this type may make it possible to shorten the rich-mode phases and thereby to reduce the increased fuel consumption resulting from these rich-mode phases. To set an excess of oxygen during the combustion of the preinjections and main injections, it is possible, for example, to reduce an injections quantity, open a throttle valve in the intake path and/or close an exhaust gas recirculation.

Further features and aspects of the present invention are described in the following description of an example embodiment of the present invention with reference to the drawing.

BRIEF DESCRIPTION OF THE DRAWING

The FIGURE illustrates a diesel engine according to the present invention with exhaust gas purification system for performing the method according to the present invention.

DETAILED DESCRIPTION

Figure 1:
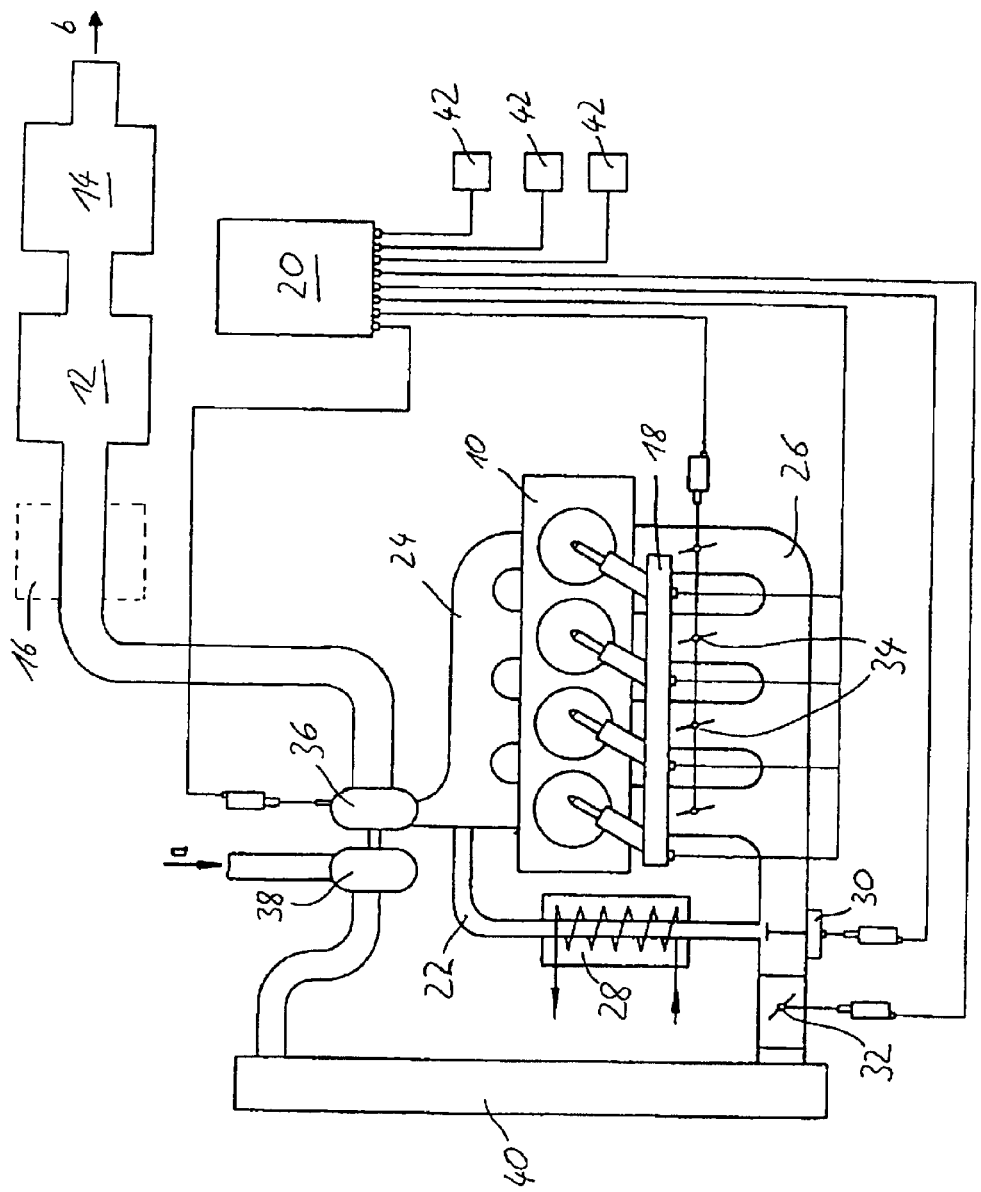

The schematic view of the FIGURE illustrates a diesel engine 10, which is provided with an exhaust gas purification system having a first catalytic converter unit 12, which generates ammonia from corresponding exhaust gas constituents when there is a rich exhaust gas composition. Downstream of the first catalytic converter unit 12, there is a second catalytic converter unit 14, which adsorbs ammonia generated by the first catalytic converter unit 12 when there is a rich exhaust gas composition. When there is a lean exhaust gas composition, the second catalytic converter unit 14 releases the ammonia again, and this ammonia then serves as a reducing agent for a reduction reaction, by which nitrogen oxides which are present in the exhaust gas are converted into nitrogen, with simultaneous oxidation of the ammonia. As soon as the temporarily stored quantity of ammonia in the second catalytic converter unit 14 has been exhausted in lean mode, the engine is switched to rich mode.

Upstream of the first catalytic converter unit 12, dashed lines indicate a third catalytic converter unit 16, which may optionally be present and is intended to temporarily store nitrogen oxides which are present in the exhaust gas when there is a lean exhaust gas composition and to release nitrogen oxides which have previously been temporarily stored again when there is a rich exhaust gas composition. The third catalytic converter unit 16 may be provided in order to accelerate the generation of ammonia by the first catalytic converter unit 12 in rich mode.

The present invention may also allow an increased quantity of nitrogen oxides to be provided in the exhaust gas during rich mode of the diesel engine 10 by influencing the fuel combustion in the diesel engine 10 itself. This may accelerate the generation of ammonia in the first catalytic converter unit 12. The rich-mode phases which may be required for generation of the ammonia may in this manner be shortened compared to conventional methods.

The fuel combustion in the diesel engine 10 is influenced primarily by an injection system 18, which is controlled by a central engine control unit 20. A total injection quantity which is provided for injection into a combustion chamber of the diesel engine 10 during a combustion cycle may be divided, by the central engine control unit 20, into at least one preinjection, at least one main injection and at least one afterinjection.

The diesel engine 10 is provided with an exhaust gas recirculation line 22, which connects an exhaust manifold 24 to an intake manifold 26 and leads via an exhaust gas recirculation heat exchanger 28. The exhaust gas recirculation line 22 may be opened and closed by an exhaust gas recirculation valve 30, arranged in the intake path, under control of the central engine control unit 20.

Furthermore, the diesel engine 10 is provided with a throttle valve 32 in the intake path upstream of the exhaust gas recirculation valve 30, and this valve may be controlled by the central engine control unit 20. Furthermore, in the intake path for each individual combustion chamber of the diesel engine 10 there are individual throttle valves 34, which may be set by the central engine control unit 20.

Starting from the exhaust manifold 24, the exhaust gases from the diesel engine 10 firstly pass to an exhaust gas turbine 36, the geometry of which may be altered via the control unit 20. The exhaust gas turbine 36 drives a compressor 38, which sucks in fresh air at the point indicated by a and forces it into the intake path and therefore the intake manifold 26 of the diesel engine 10. Between compressor 38 and intake manifold 26 there is a charge-air cooler 40. Downstream of the second catalytic converter unit 14, the exhaust gases leave the exhaust gas purification system in the direction indicated by b.

The central engine control unit 20 acquires information about current values of operating parameters of the diesel engine 10 from sensors 42, which are only schematically indicated. The sensors 42 are used, for example, to record an exhaust gas combustion downstream of the second catalytic converter unit 14, so that it is possible to determine whether the ammonia which has been stored in the second catalytic converter unit 14 has been exhausted and consequently it is necessary to switch from lean mode to a rich mode of the diesel engine 10. Furthermore, the sensors 42 of the central engine control unit 20 provide information such as charge pressure, charge-air temperature, crankshaft angle, exhaust gas temperature, etc.

Characteristic diagrams for both a rich mode and a lean mode of the diesel engine 10 are stored in the central engine control unit 20 and are used to control the diesel engine 10. According to the present invention, these characteristic diagrams for lean and rich mode are distinguished by the fact that the starts of injection of the preinjections and the main injections are substantially identical in the characteristic diagrams for lean mode and rich mode. The rich or lean mode is set almost exclusively by changing an afterinjection in terms of quantity, duration and time. There may be any desired number of preinjections. One to two main injections may be provided. The afterinjection includes an afterinjection which is also burned and optionally a further, offset afterinjection. The start of injection of the first afterinjection is configured so that this first afterinjection is burned in the combustion chamber and as a result both contributes to the output engine load and also effects very high exhaust gas temperatures, which are required in the first catalytic converter unit 12 in order to synthesize ammonia from nitrogen and hydrogen. Furthermore, the optional lean or rich configuration of the combustion is effected by adapting the first afterinjection and if appropriate using the further, offset afterinjection.

Since the starts of injection of the preinjections and of the main injections in rich mode substantially correspond to the starts of injection with lean diesel engine combustion, the maximum pressure rise in the combustion chamber and the position of the maximum pressure rise in the combustion chamber in rich mode approximately correspond to the values for lean diesel engine combustion with preinjection and main injection. Consequently, a transition between lean mode and rich mode is possible so that a driver of a motor vehicle equipped with the diesel engine 10 does not notice this change. On aspect of the present invention relates to the fact that the preinjection quantities and the main injection quantity, due to the engine operation without exhaust gas recirculation, are converted in the combustion chamber with a very high excess of oxygen. This allows a significantly higher level of nitrogen oxide to be formed in the combustion chamber than during normal combustion with exhaust gas recirculation. In the combustion method according to the present invention, the amount of hydrogen molecules required for the ammonia synthesis may be generated in the exhaust gas by the afterinjection quantity which is introduced after the main injection quantity and is partially also burned. The rich exhaust gas composition which is required for the ammonia synthesis may be set in a targeted manner. Despite the lean combustion of the preinjection quantities and of the main injection quantities, the subsequently introduced afterinjection quantity which is partially also burned overall results in a rich mode of the diesel engine 10 with a rich exhaust gas composition. As a result of the partial combustion or preparation of the afterinjection quantity being influenced in a targeted manner by selection of the time, duration and quantity of the afterinjection by the engine control unit as a function of various operating parameters of the diesel engine 10, it is possible to set different ratios of hydrogen, carbon monoxide and hydrocarbons and also nitrogen oxides with respect to one another.

What is claimed is:

1. A method for operating an internal combustion engine including an exhaust gas purification system, comprising:
   alternately setting a rich mode of the internal combustion engine with a rich exhaust gas composition and a lean mode of the internal combustion engine with a lean exhaust gas composition;
   synthesizing and storing ammonia by the exhaust gas purification system with the rich exhaust gas composition;
   reducing nitrogen oxides to form nitrogen by the stored ammonia by the exhaust gas purification system with the lean exhaust gas composition;
   introducing a quantity of fuel during a combustion cycle of the internal combustion engine by at least one preinjection, at least one main injection and at least one afterinjection; and
   burning the at least one preinjection and the at least one main injection under excess oxygen to generate a quantity of nitrogen oxides sufficient for ammonia synthesis;
   wherein the rich exhaust gas composition and the lean exhaust gas composition are set in the setting step in accordance with the at least one afterinjection.

2. The method according to claim 1, further comprising at least partially burning the at least one afterinjection in a combustion chamber, the at least partial burning of the at least one afterinjection contributing to engine load.

3. The method according to claim 1, further comprising combusting in rich mode the quantity of fuel introduced during a combustion cycle of the internal combustion engine without gas recirculation.

4. The method according to claim 1, wherein the lean exhaust gas composition and the rich exhaust gas composition are set in the setting step in accordance with at least one first afterinjection that burns in a combustion chamber and at least one further, offset afterinjection.

5. The method according to claim 1, wherein starts of injection of the preinjection in the rich mode substantially correspond to starts of injection of the preinjection in the lean mode.

6. The method according to claim 1, wherein starts of injection of the main injection in the rich mode substantially correspond to starts of injection of the main injection in the lean mode.

7. The method of claim 1, wherein the quantity of nitrogen oxides are generated even during a rich mode.

8. The method of claim 1, wherein the quantity of nitrogen oxides are generated even during a rich mode to shorten a duration of the rich mode.

9. The method of claim 1, wherein the quantity of nitrogen oxides are generated even during a rich mode so that nitrogen oxide storage during a lean mode and nitrogen oxide release during the rich mode are not required.

10. The method of claim 1, wherein the quantity of nitrogen oxides are generated even during a rich mode to shorten a duration of the rich mode, and so that nitrogen oxide storage during a lean mode and nitrogen oxide release during the rich mode are not required.

11. An internal combustion engine having an exhaust gas purification system, comprising:
a first catalytic converter unit configured to generate ammonia with a rich exhaust gas composition from corresponding exhaust gas constituents;
a second catalytic converter unit arranged downstream of the first catalytic converter unit and configured to temporarily store ammonia generated by the first catalytic converter unit with a rich exhaust gas composition and to subject nitrogen oxides present in exhaust gas to a reduction reaction using the temporarily stored ammonia as a reagent with a lean exhaust gas composition; and
an injection system including:
an arrangement configured to introduce a quantity of fuel in accordance with at least one preinjection, at least one main injection and at least one afterinjection;
an arrangement configured to set an excess of oxygen in rich mode during combustion of the at least one preinjection and at least one main injection in a combustion chamber; and
an arrangement configured to alter a time, a quantity and a duration of the at least one afterinjection to set one of the rich exhaust gas composition and the lean exhaust gas composition;
wherein the at least one preinjection and the at least one main injection are burned under the excess oxygen to generate a quantity of nitrogen oxides sufficient for ammonia synthesis.

12. The internal combustion engine of claim 11, wherein the quantity of nitrogen oxides are generated even during a rich mode.

13. The internal combustion engine of claim 11, wherein the quantity of nitrogen oxides are generated even during a rich mode to shorten a duration of the rich mode.

14. The internal combustion engine of claim 11, wherein the quantity of nitrogen oxides are generated even during a rich mode so that nitrogen oxide storage during a lean mode and nitrogen oxide release during the rich mode are not required.

15. The internal combustion engine of claim 11, wherein the quantity of nitrogen oxides are generated even during a rich mode to shorten a duration of the rich mode, and so that nitrogen oxide storage during a lean mode and nitrogen oxide release during the rich mode are not required.

16. The internal combustion engine of claim 11, wherein the at least one afterinjection is at least partially burned in a combustion chamber, the at least partial burning of the at least one afterinjection contributing to engine load.

17. The internal combustion engine of claim 11, further comprising combusting in rich mode the quantity of fuel introduced during a combustion cycle of the internal combustion engine without gas recirculation.

18. The internal combustion engine of claim 11, wherein the lean exhaust gas composition and the rich exhaust gas composition are set in accordance with at least one first afterinjection that burns in a combustion chamber and at least one further, offset afterinjection.

19. The internal combustion engine of claim 11, wherein starts of injection of the preinjection in a rich mode substantially correspond to starts of injection of the preinjection in a lean mode.

20. The internal combustion engine of claim 11, wherein starts of injection of the main injection in a rich mode substantially correspond to starts of injection of the main injection in a lean mode.

21. An internal combustion engine having an exhaust gas purification system, comprising:
a first catalytic converter unit configured to generate ammonia with a rich exhaust gas composition from corresponding exhaust gas constituents;
a second catalytic converter unit arranged downstream of the first catalytic converter unit and configured to temporarily store ammonia generated by the first catalytic converter unit with a rich exhaust gas composition and to subject nitrogen oxides present in exhaust gas to a reduction reaction using the temporarily stored ammonia as a reagent with a lean exhaust gas composition; and
an injection system including:
means for introducing a quantity of fuel in accordance with at least one preinjection, at least one main injection and at least one afterinjection;
means for setting an excess of oxygen in rich mode during combustion of the at least one preinjection and at least one main injection in a combustion chamber; and
means for altering a time, a quantity and a duration of the at least one afterinjection to set one of the rich exhaust gas composition and the lean exhaust gas composition;
wherein the at least one preinjection and the at least one main injection are burned under the excess oxygen to generate a quantity of nitrogen oxides sufficient for ammonia synthesis.

22. The internal combustion engine of claim 21, wherein the quantity of nitrogen oxides are generated even during a rich mode.

23. The internal combustion engine of claim 21, wherein the quantity of nitrogen oxides are generated even during a rich mode to shorten a duration of the rich mode.

24. The internal combustion engine of claim 21, wherein the quantity of nitrogen oxides are generated even during a rich mode so that nitrogen oxide storage during a lean mode and nitrogen oxide release during the rich mode are not required.

25. The internal combustion engine of claim 21, wherein the quantity of nitrogen oxides are generated even during a rich mode to shorten a duration of the rich mode, and so that nitrogen oxide storage during a lean mode and nitrogen oxide release during the rich mode are not required.

26. The internal combustion engine of claim 21, wherein the at least one afterinjection is at least partially burned in a combustion chamber, the at least partial burning of the at least one afterinjection contributing to engine load.

27. The internal combustion engine of claim 21, further comprising combusting in rich mode the quantity of fuel introduced during a combustion cycle of the internal combustion engine without gas recirculation.

28. The internal combustion engine of claim 21, wherein the lean exhaust gas composition and the rich exhaust gas composition are set in accordance with at least one first afterinjection that burns in a combustion chamber and at least one further, offset afterinjection.

29. The internal combustion engine of claim 21, wherein starts of injection of the preinjection in a rich mode substantially correspond to starts of injection of the preinjection in a lean mode.

30. The internal combustion engine of claim 21, wherein starts of injection of the main injection in a rich mode substantially correspond to starts of injection of the main injection in a lean mode.

* * * * *